Oct. 28, 1958     E. M. PERKINS     2,858,118
MIXING BOWL COVER
Filed Dec. 14, 1956
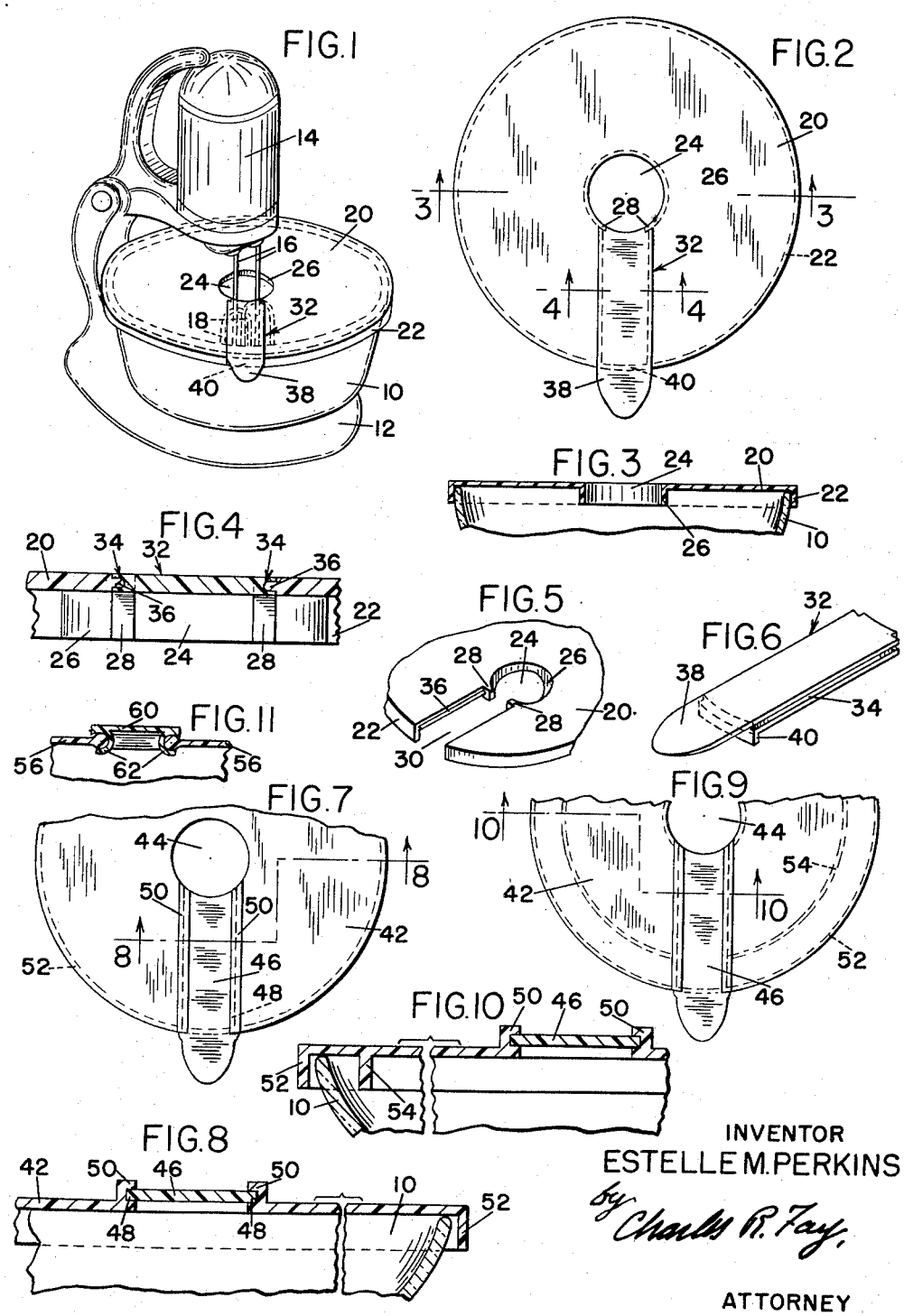
INVENTOR
ESTELLE M. PERKINS
ATTORNEY

2,858,118
MIXING BOWL COVER
Estelle M. Perkins, Sterling, Mass.
Application December 14, 1956, Serial No. 628,362
1 Claim. (Cl. 259—125)

This invention relates to a new and improved mixing bowl cover which may be used for any bowl but is particularly adapted for use with a mixer or beater whether of the hand or power-operated type, and the principal object of the invention resides in the provision of a cover for such a bowl, preventing splattering and at the same time having means provided for the addition of ingredients to the mixing bowl while the cover is in place with the beater in position to operate.

Further objects of the invention include the provision of a mixing bowl cover which may be conveniently molded of commercial plastic and is provided with a generally flat circular main body portion having a generally central opening to accommodate the beater, said opening communicating with a radial opening extending to an edge of the cover and provided with a closure means for selectively closing or opening the same whereby the cover is made continuous but may be applied to the bowl with the beater in place extending through the openings; and, once the closure for the radial opening is in position, the same may be withdrawn in order to place additional ingredients into the bowl.

Other objects and advantages of the invention will appear hereinafter.

Reference is to be had to the accompanying drawings, in which—

Fig. 1 is a perspective view illustrating the device in operation;

Fig. 2 is a top plan view of the cover on an enlarged scale;

Fig. 3 is a section on line 3—3 of Fig. 2;

Fig. 4 is an enlarged section on line 4—4 of Fig. 2;

Fig. 5 is a fragmentary perspective view illustrating the opening for the cover;

Fig. 6 is a perspective view of the slidable closure;

Fig. 7 is a plan view illustrating a modification, part being broken away;

Fig. 8 is a section on line 8—8 of Fig. 7;

Fig. 9 is a plan view of a modification;

Fig. 10 is a section on line 10—10 of Fig. 9; and

Fig. 11 is a view similar to Fig. 4 but showing a modification.

In carrying out the present invention, the same has been shown as applied to a mixing bowl 10 of conventional design which may be supported upon a stand 12 of a beater mechanism 14 having a shaft or shafts 16 for operating beaters 18 mixing ingredients in bowl 10. The present invention may be applied to any kind of power beater or mixer or any such mechanism operated by hand.

The cover comprises a generally circular flat main body portion 20 which may be provided with a down-turned peripheral flange 22 customarily extending exteriorly of the edge of bowl 10 as best seen in Fig. 3. The main body portion 20 is provided with a generally circular central opening 24 which has a down-turned edge flange 26. This edge flange, however, is interrupted and terminates in the limit fingers or projections 28 for a purpose to be described.

The opening 24 communicates with a generally radial opening 30 (see Fig. 5) and this provides for application of the cover to the bowl 10 even though the mixture or beater is in position as shown in Fig. 1. This is accomplished simply by sliding the cover diametrically with the shaft 16 received in the openings.

The radial opening 30 is adapted to be closed by a sliding closure generally indicated at 32 and having edge grooves as at 34 to accommodate tongues 36 at the edges of opening 30 as clearly shown in Figs. 4 and 5. The slidable closure 32 may be provided with a finger tab 38 for easy manipulation thereof, and it will be seen that the sliding cover 32 will be stopped by the projections 28 and will not under any circumstances move far enough to impinge upon the shaft 16. Also, if desired, the sliding closure 32 may be provided with a flange 40 to complete the flange 22 at the point of intersection of opening 30 with flange 22.

There is a modified form of the device as shown in Figs. 7 and 8 wherein the cover 42 is similar to that at 20 and is provided with a similar central opening 44 and communicating radial opening as shown, the radial opening being closed by a sliding member 46. This member, however, has plain edges 48 slidingly received in upstanding integral channel members 50 which face each other. Also, cover 42 may be provided with a peripheral flange 52 similar to that at 22 and either of these covers may also have a concentric internal flange 54. The two flanges receive the edge of bowl 10 between them, as shown in Fig. 10.

Another modification of the sliding closure is illustrated in Fig. 11. In this case, the cover is indicated by the numeral 56 and has enlarged beads 58 at the edges of the radial opening 30. The sliding closure is indicated at 60 and is provided with downwardly-extending oppositely-facing channel members 62 which slidingly receive the enlarged beads 58 on the edges of the cover portions 56.

It will be seen that this invention provides a very handy splash cover of the class described which is efficient in operation and easy to use, and which may be maintained in position while still providing means for adding ingredients to the mix.

Having thus described my invention and the advantages thereof, I do not wish to be limited to the details herein disclosed, otherwise than as set forth in the claim, but what I claim is:

A molded plastic cover for a mixing bowl comprising a main substantially flat and circular body portion, a pair of concentric depending flanges thereon, one being located at the periphery thereof and the other being located inwardly of the first-named flange, said body portion having a generally central opening to accommodate the shaft of a beater, and a generally radially arranged opening for the accommodation of ingredients to be mixed, said openings intersecting and the radial opening extending through the extreme edge of the flat body portion of the cover, a radially slidable closure selectively operable to open and close the radial opening, said closure being completely separable from the cover by sliding it radially from the radial opening, interengaging slidable guide means on the corresponding edges of the closure and the radial opening, said guide means including rounded ways on certain of said edges and concave matching channels on the other edges, means to limit the inward radial motion of said closure in closed condition thereof, said limiting means comprising a pair of downwardly extending abutments in the central opening arranged to abut the inward end of the closure to prevent extent of the closure into the central opening, said abutments being spaced to allow the mixing bowl shaft to enter between the same, an operating fingerhold on the closure for one-handed actuation thereof, said fingerhold extending radially outwardly from said closure past the edge of the cover.

References Cited in the file of this patent
UNITED STATES PATENTS
1,179,984    Vidinghoff _____ Apr. 18, 1916